Oct. 29, 1963  E. T. GILLMAN ETAL  3,108,921
MACHINE FOR THE MANUFACTURE OF RAILS USED IN LADDERS
Filed Dec. 31, 1959  10 Sheets-Sheet 1

INVENTORS: EDWARD T. GILLMAN
GENE E. BASILE
BY
ATTORNEY

INVENTORS: EDWARD T. GILLMAN
GENE E. BASILE
BY
Charles D Richard
ATTORNEY

Oct. 29, 1963     E. T. GILLMAN ETAL     3,108,921
MACHINE FOR THE MANUFACTURE OF RAILS USED IN LADDERS
Filed Dec. 31, 1959                    10 Sheets-Sheet 3

INVENTORS: EDWARD T. GILLMAN
GENE E. BASILE
BY
Charles D Richard
ATTORNEY

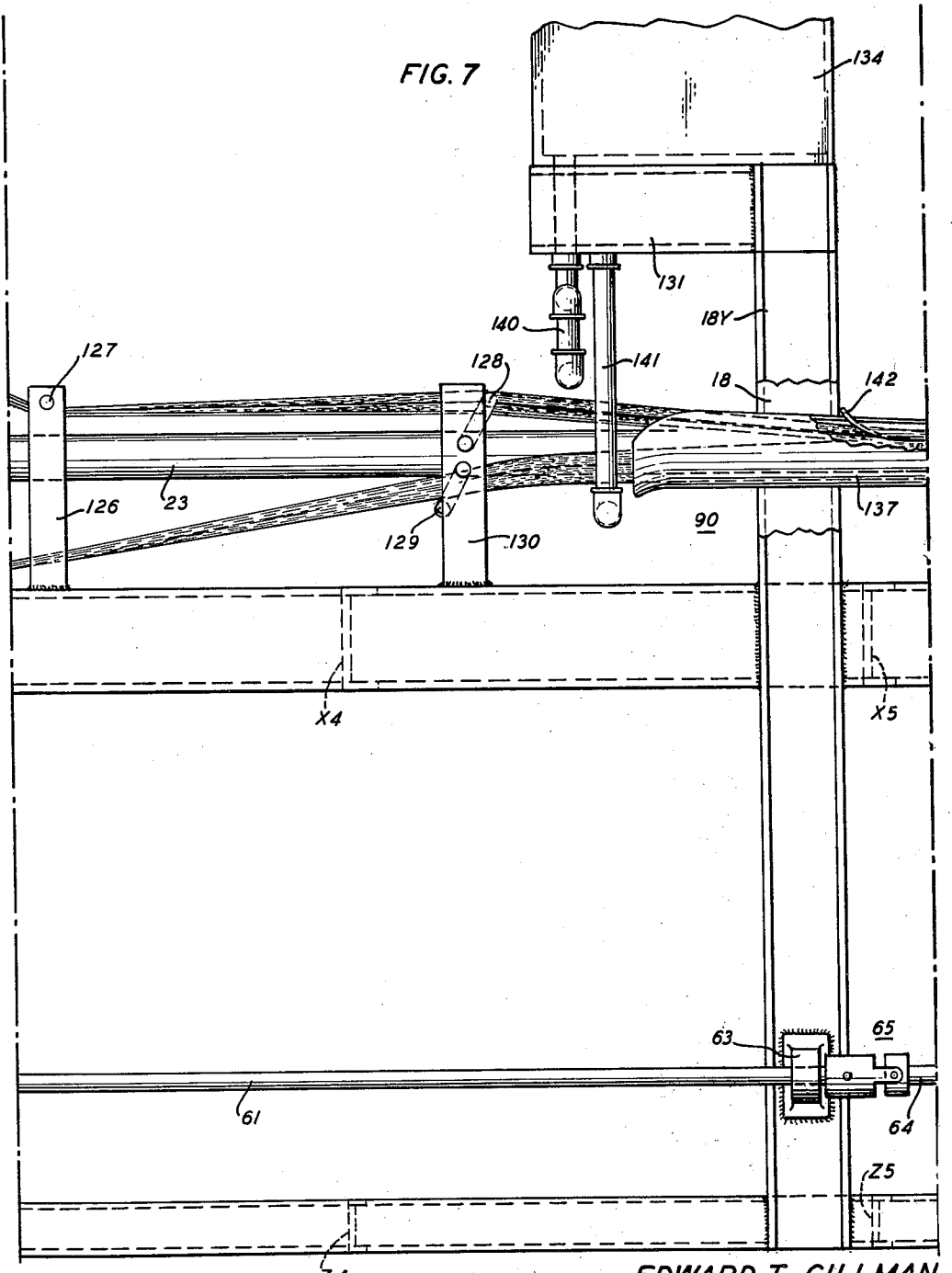

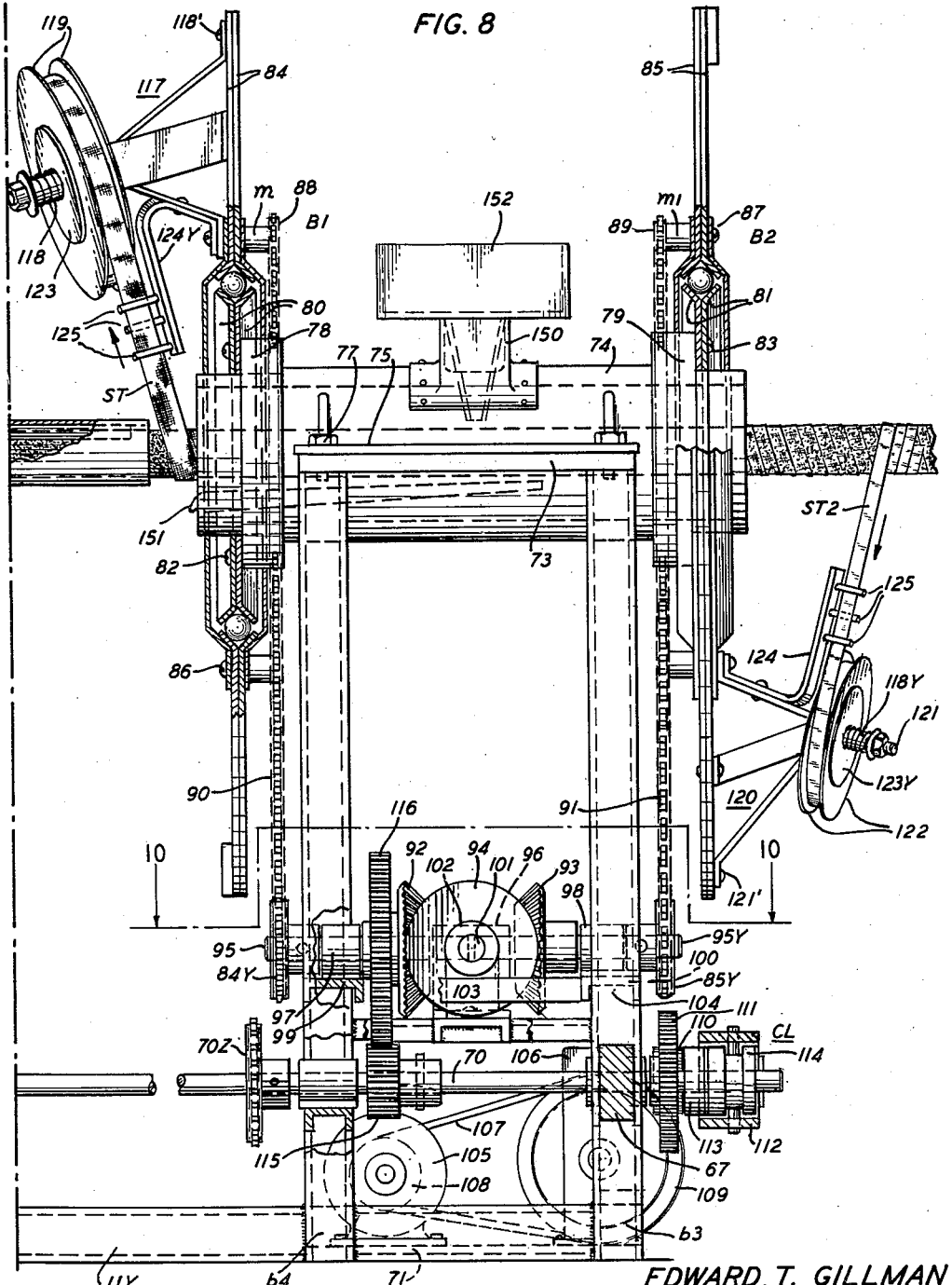

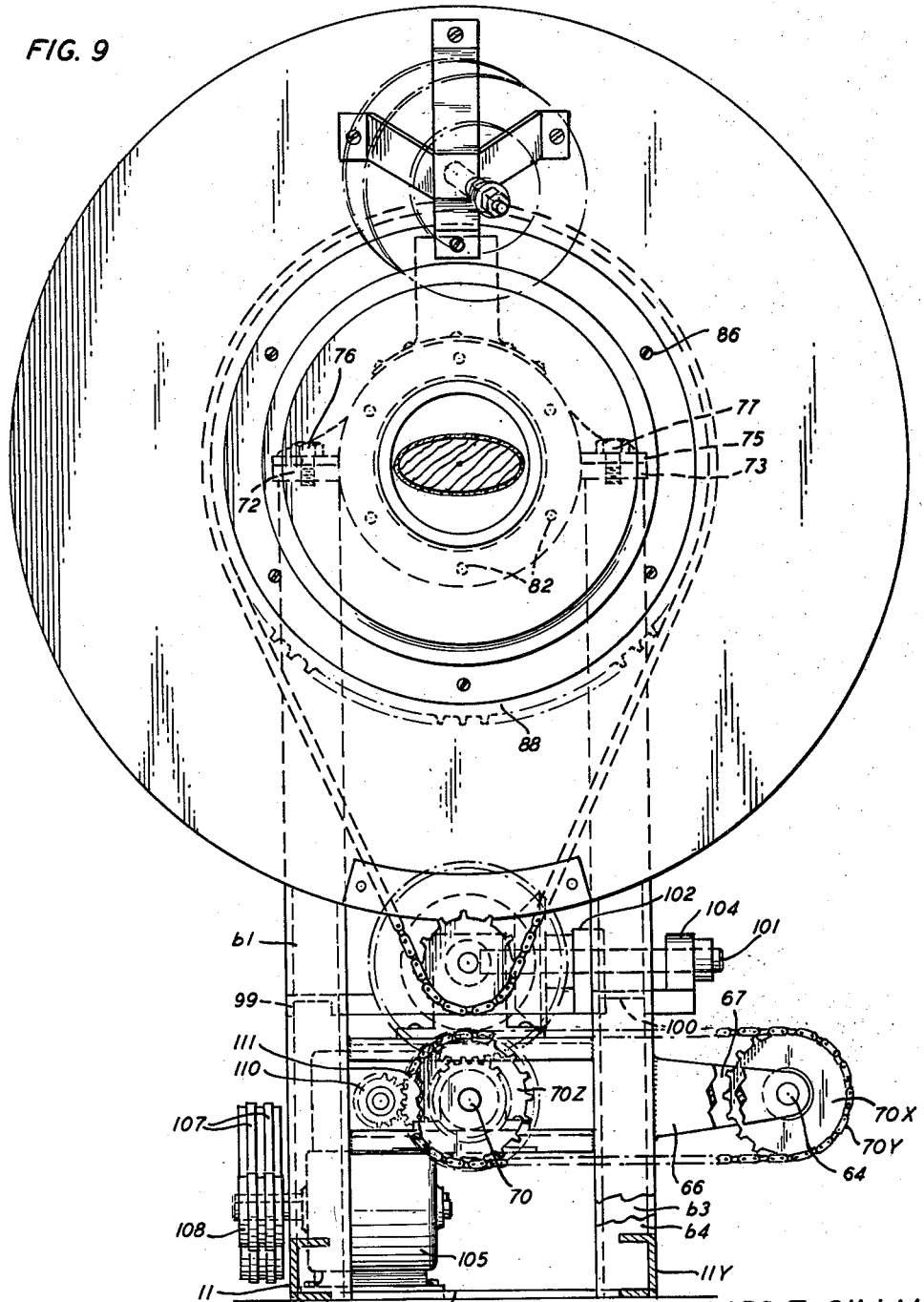

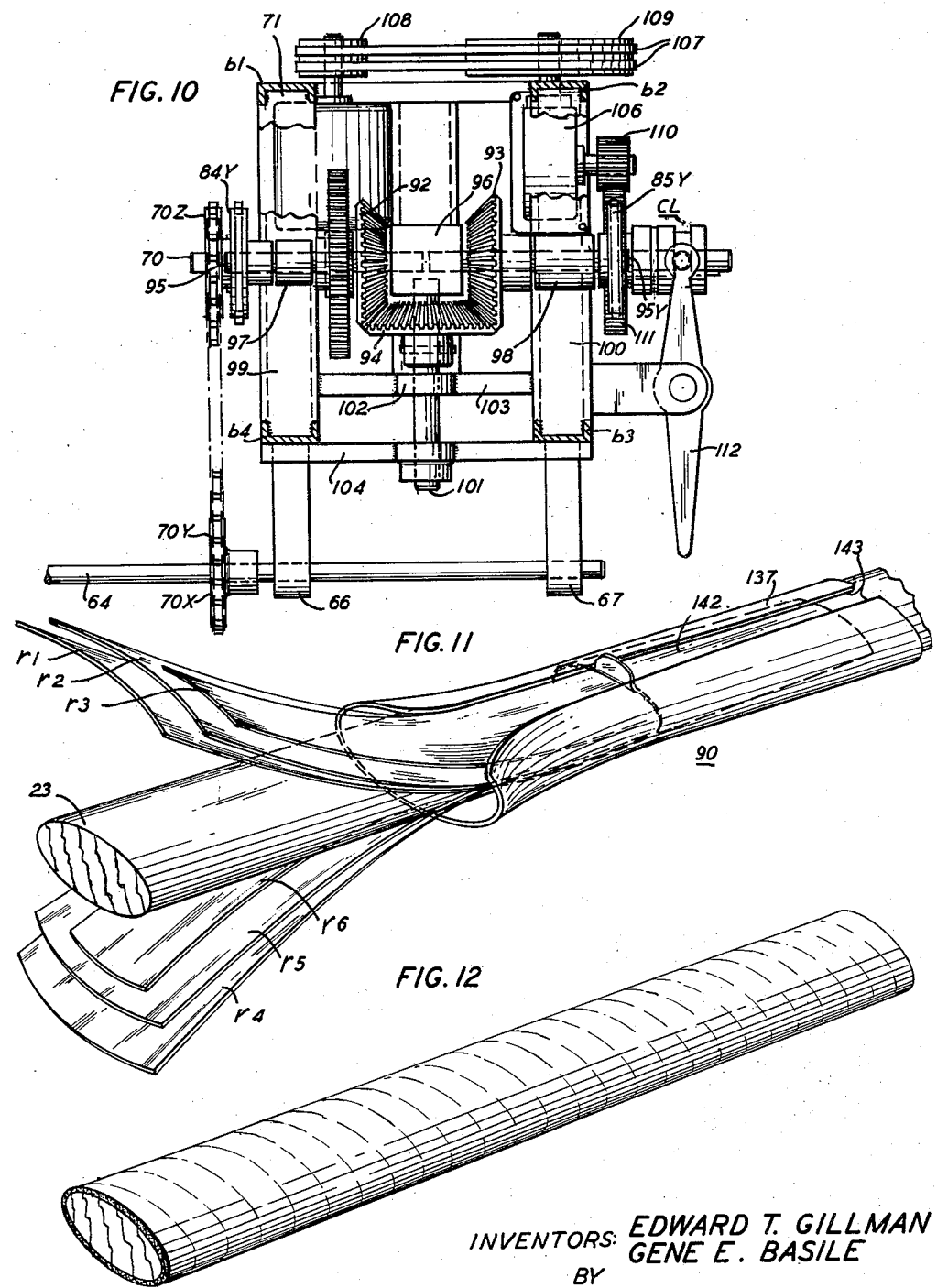

United States Patent Office 3,108,921
Patented Oct. 29, 1963

3,108,921
MACHINE FOR THE MANUFACTURE OF RAILS USED IN LADDERS
Edward T. Gillman, Rutherford, and Gene E. Basile, Newark, N.J., assignors to Putnam Rolling Ladder Co Inc., New York, N.Y.
Filed Dec. 31, 1959, Ser. No. 863,309
5 Claims. (Cl. 156—432)

This invention has reference to a machine which is especially well adapted for use in the manufacture of rails embodied in ladders of the type disclosed in Patent No. 2,885,132, issued to Thaddeus C. Campbell, dated May 5, 1959, assigned to the Putnam Rolling Ladder Co Inc. of Howard Street, New York, N.Y., and in a patent pending application filed April 1, 1959, in the names of Charles D. Richard and Edward T. Gillman, Serial No. 803,439, now Patent No. 3,009,532.

In the ladder which forms the subject matter of Patent 2,885,132 above mentioned, each rail consists of a two part core, each part having a square cross-section, and each section is provided to one side thereof with semicircular recesses, the recesses in one section co-operating with the recesses in the other section to form bearing-like openings when the two parts are assembled for receiving the ends of the rungs comprised in the ladder, these two core parts being secured in assembled relation by fiber glass strips which are manually laid lengthwise to the four sides of each part forming the core, in addition to another fiber glass strip helically wound manually over the longitudinally extending strip, and the whole assembly immersed into a plastic compound in a trough and compressed by the tightening of a plurality of manually operable clamping devices, the trough being then heated so as to reduce the curing time of the plastic material, and this followed by the removal of the clamping devices.

While ladders constructed according to the disclosure of the patent above mentioned have been found entirely satisfactory from the strength-weight ratio standpoint, the manual wrapping of the fiber glass strips lengthwise around each side of the two parts forming the core, and, in turn, the manual wrapping of another strip helically around the longitudinally laid strips, have been found to be slow and costly operations, added to the time consuming operation in the impregnation of the fiber glass strips with plastic material under pressure and heat.

The rail constructed according to the teaching disclosed in the patent pending application to Charles D. Richard and Edward T. Gillman, above mentioned, makes use of a core consisting of a single piece of fibrous material having an ellipse cross-section making possible the reduction of the weight of the rail, while the ellipse cross-section of the single piece core makes possible the machine wrapping of the longitudinally disposed fiber glass strips under tension, and the impregnating of such strips with a plastic material simultaneously with the helically winding of a fiber glass strip over the longitudinally disposed fiber glass strips, in addition to the wrapping of a strip of a material known in the trade as Mylar, over the helically wound fiber glass strip in a continuous machine operation which may include any number of rail sections disposed in end to end abutting relation, the Mylar strip having the characteristic of not wetting with the plastic material used for impregnating the fiber glass strips, and therefore is adapted to be removed from the completed rail following the curing of the plastic material therearound, the winding of the Mylar strip over the outer disposed surface of the helically wound fiber glass strips has been found, in actual use, to produce an unusually smooth surface over the helically wound fiber glass strip upon the removal of the Mylar strip in the final operation.

The present invention has for object the provision, as mentioned in page 4, lines 7 to 10 inclusive, of the patent pending application filed in the names of Charles D. Richard and Edward T. Gillman, of a machine for use for effecting a number of operations, such as the longitudinal wrapping of the fiber glass strips around the core, the winding of the fiber glass strip helically around the longitudinally disposed strips, the winding of the Mylar strip helically over the helically wound fiber glass strip, and the simultaneous spraying of the core, all the strips then under tension with a plastic material in a continuous machine operation.

The novel features of the present invention will appear from the following description, and by the claims appended thereto, reference being had to the accompanying drawing in which the blocks numbered FIG. 1, FIG. 2, FIG. 3 and FIG. 4 shown in FIG. 13, indicate the position of the sheets of the drawing depicting in top assembly views the entire combination of the operating parts embodied in the machine, while the blocks numbered FIG. 5, FIG. 6, FIG. 7 and FIG. 8, are front elevation views of FIGS. 1 to 4 in corresponding ascending numerical order. More specifically:

FIG. 7 is a front elevation view of FIG. 3 showing the sets of strips in position relative to the core at the wrapping and spraying point from a tank mounted on upright supports embodied in the frame structure of the machine, the strips wrapping die device being shown with portions broken away;

FIG. 8 is a side elevation view of FIG. 4 showing the mechanism for moving the helically wrapping strip magazines concentric relative to the core, a portion of the latter being shown wrapped over by the different strips;

FIG. 9 is a left side view of FIG. 8 showing the gearing mechanism for actuating the spool magazines concentric to the core, the latter being shown in end view in position into the hub-shaped mounting element of the machine;

FIG. 10 is a sectional view taken on line 10—10 of FIG. 8 showing the driving mechanism for actuating the elements carrying the spool magazines of the helically winding strips under control of a clutching device, a number of parts embodied in the frame of the machine being shown in section;

FIG. 11 is a view in perspective showing a portion of the core and of the different strips in engaged relation with the die for wrapping the longitudinally disposed strips around the core upon the movement of the latter; and FIG. 12 is a perspective view of a completed rail section.

Figure 5:
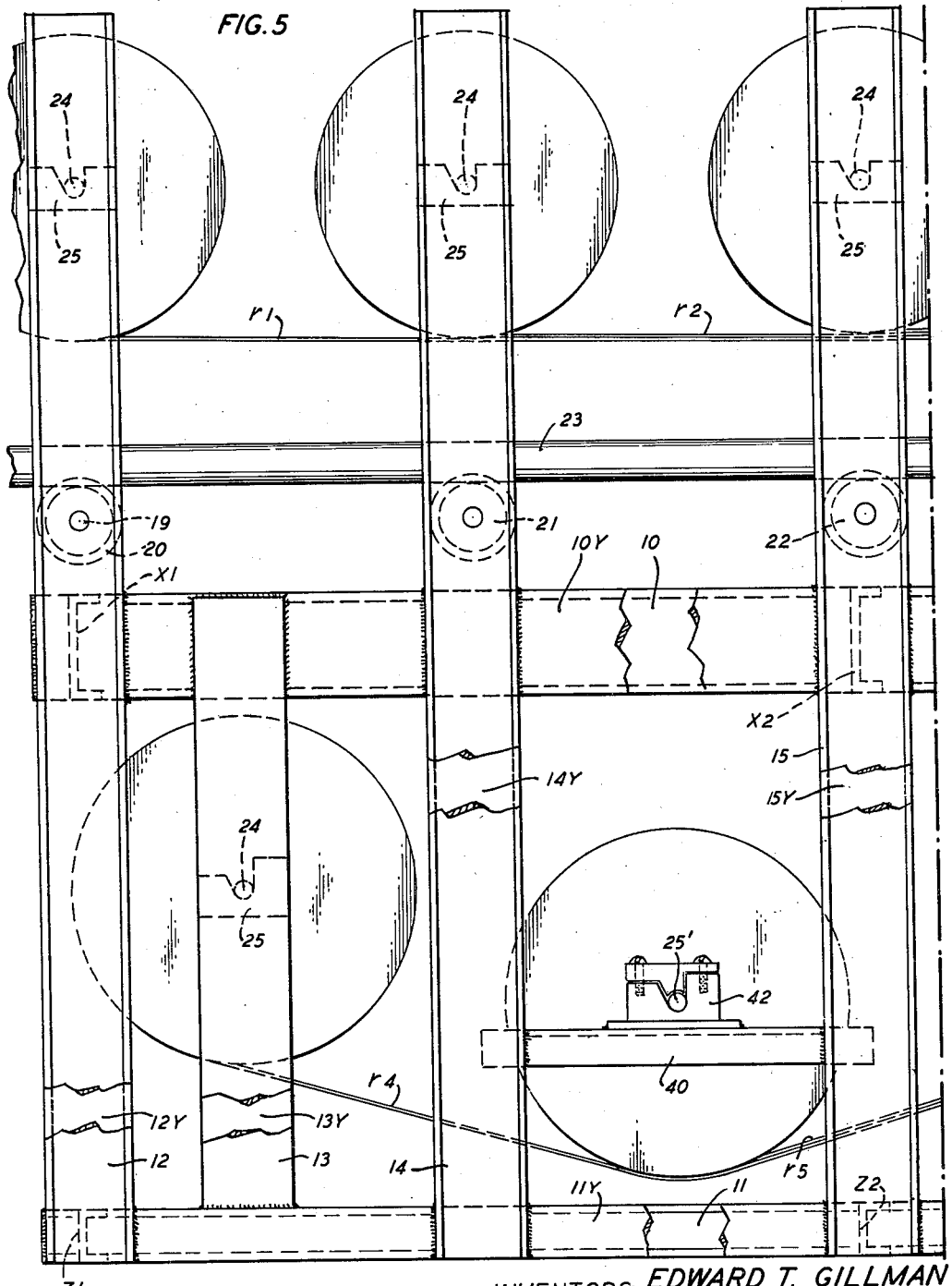
FIG. 5 is a front elevation view of FIG. 1 showing the shafts for the spool carrying fiber glass strips supported in bearings mounted on upright elements embodied in the frame structure of the machine, a portion of the core being shown in axial alignment with the core operating mechanism shown in FIG. 2.

As shown in the several views of the drawing, the machine of the present invention consists, as best seen in FIG. 5, of a frame structure having two pairs of horizontally and parallelly disposed beams 10—10y and 11—11y of channel-shaped cross-section, and pairs of upright disposed beams 12—12y, 13—13y, 14—14y, 15—15y, 16—16y, 17—17y and 18—18y, secured to the horizontally disposed beams 10—10y and 11—11y, as by welding, while the beams 10—10y are held in spaced relation by transversely disposed beams $x1$, $x2$, $x3$, $x4$ and $x5$, and the beams 11—11y by transversely disposed beams $z1$, $z2$, $z3$, $z4$ and $z5$ having their ends secured, as by welding, to their respective beams 10—10y and 11—11y.

Figure 1:
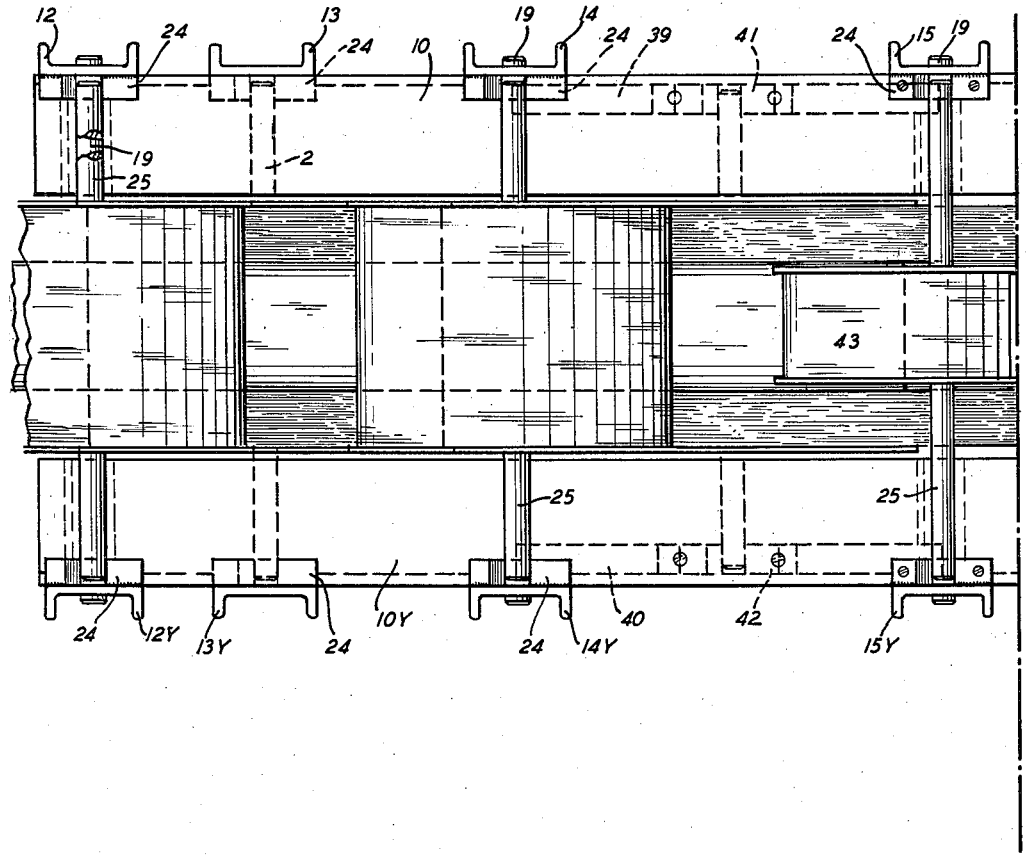
FIG. 1 is a top assembly view of the fiber glass strip magazines in the form of spools mounted for free rotation on upright supporting members embodied in the frame structure of the machine.

The pair of upright disposed beams 12—12y, FIGS. 1 and 5, are each provided with a bearing aperture for rotatably supporting the shaft 19 of a roller 20, which cooperates with similar rollers 21 and 22 mounted on their respective pairs of upright beams 14—14y and 15—15y to serve for supporting the core 23 in coaxial alignment with a plurality of pairs of driving and idle rollers, shown in FIGS. 2 and 6, forming part of the core actuating mechanism, which will be hereinafter described in detail.

Figure 6:
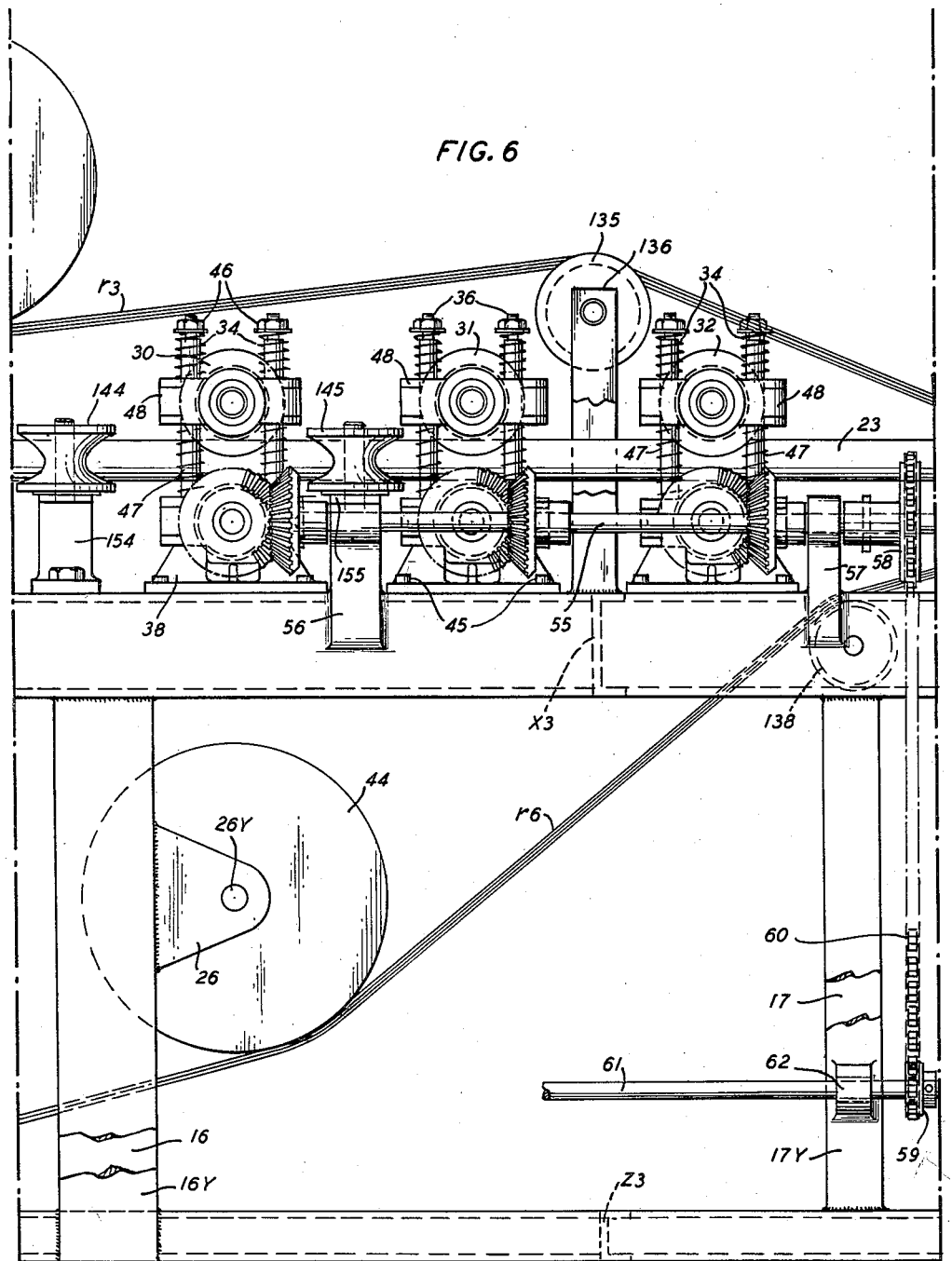
FIG. 6 is a front elevation view of FIG. 2 showing the core actuating mechanism with a number of elements comprised in the frame structure of the machine, shown with portions broken away.

To the pair of upright beams 12—12y, 13—13y, 14—14y and 15—15y, are mounted similarly shaped blocks 25, FIGS. 1 and 5, arranged by pairs, forming bearing for supporting their respective shafts 24 on which magazines, in the form of spools, serve for receiving respective fiber glass strips $r1$, $r2$, $r3$, and $r4$, while a strip $r5$ winds around a spool having a shaft $25^1$ supported by bearing block 42 carried by bars 39 and 40, having their ends welded to the pair of upright beams 14—14y and 15—15y respectively, best seen in FIGS. 1 and 5, and onto upright supports 16—16y, as shown in FIG. 6, are welded laterally extending lobe members 26 having bearing apertures for rotatably receiving the shaft 26y serving for supporting a spool 44 for a fiber glass strip $r6$.

The core 23, which is constructed of balsa wood material, is moved longitudinally at a uniform speed by similar roller members 27, 28 and 29 keyed on respective shaft 27y, 28y and 29y in cooperation with idle roller members 30, 31 and 32. The shafts of rollers 27, 28 and 29 are supported in similar bases 37 and 38, FIGS. 2 and 6, while the supporting shafts of rollers 30, 31 and 32, are mounted in bearings, as 48—48b, fitted for sliding movement over respective pairs of studs 36—36 extending perpendicularly from the bases 37 and 38 which are secured onto their respective channel-shaped beams 10—10y by screws 45.

The idle rollers 30, 31 and 32 are held in frictional engagement with the core 23, and the latter in frictional engagement with the driving rollers 27, 28 and 29 by pairs of coiled springs 33—34 disposed concentrically over the studs 36—36, these springs being compressed to the proper tension by nuts 46 threadedly engaging the top disposed ends of studs 36—36, while coiled springs as 47—47, FIG. 6, serve for holding their respective bearing blocks 48 in an elevated position whenever the core 23 and the springs 33—34 are removed from studs 36—36 as to facilitate the placing of the core in position between the driving and idle rollers.

Figure 2:
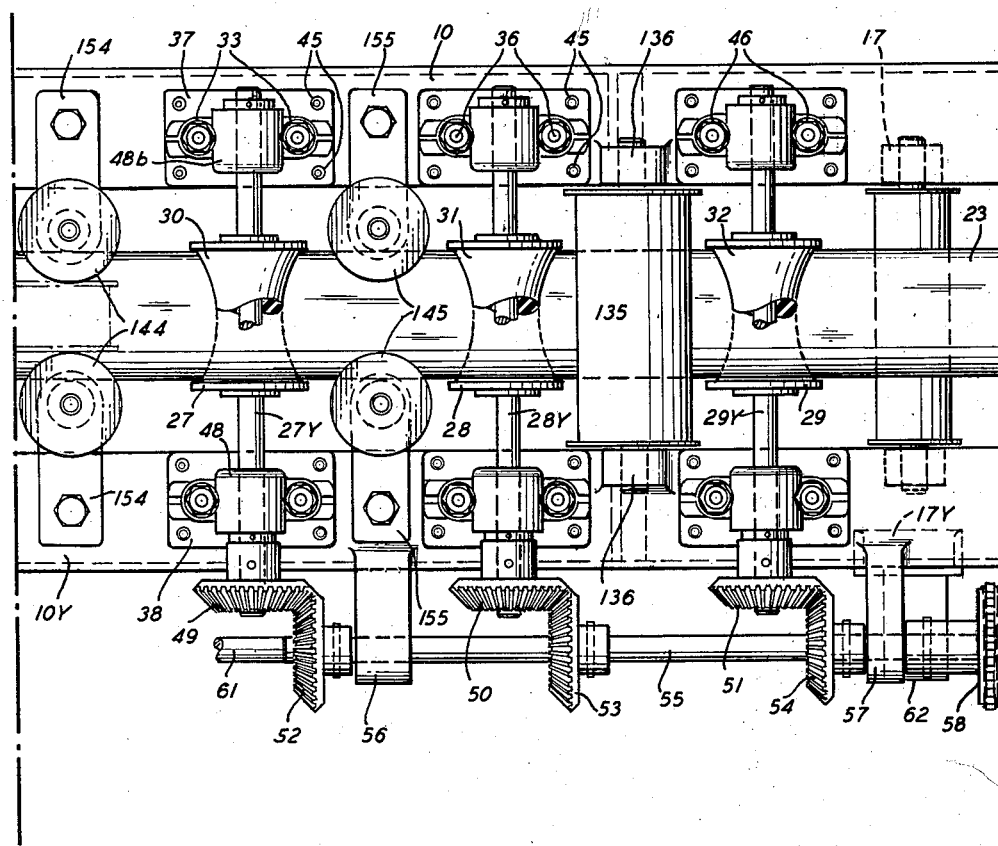
FIG. 2 is a top assembly view of the mechanism for frictionally moving the core longitudinally, shown with a number of operating parts with portions broken away.

On one of the ends of shafts 27y, 28y and 29y are keyed the angle gears 49, 50 and 51, disposed in meshing relation with similar angle gears 52, 53 and 54 keyed on a common shaft 55 journaled in bearings formed in supports 56 and 57, shown in FIGS. 2 and 6, secured, as by welding, to the channel-shaped beam 10y, and on one end of shaft 55 is keyed a sprocket wheel 58 operatively connected to a sprocket wheel 59 by a chain 60, the sprocket wheel 59 being keyed on a shaft 61 journaled in laterally extending arms 62 and 63 welded to the upright beams 17y and 18y.

Figure 4:
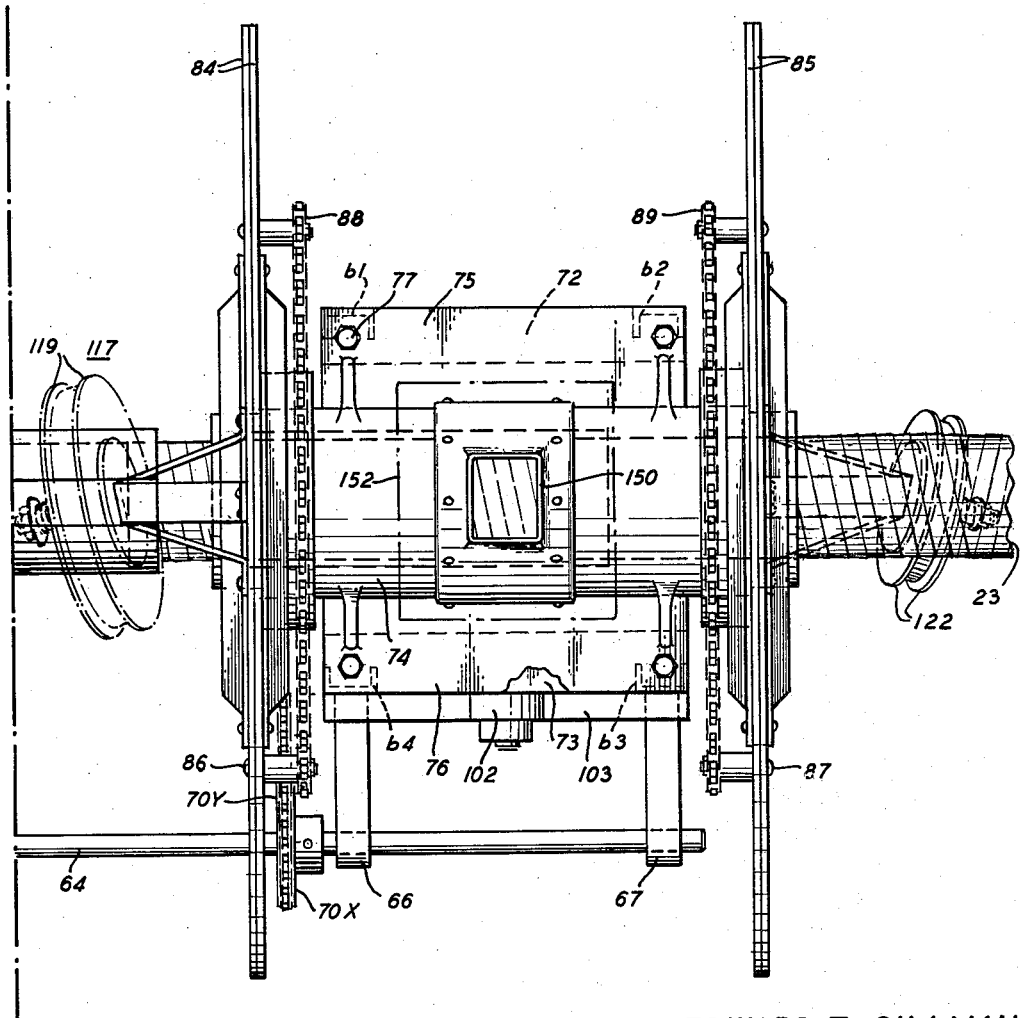
FIG. 4 is a top assembly view showing the mechanism for helically winding a fiber glass strip over the fiber glass strips which are disposed longitudinally of the core simultaneously with the winding of another strip over the helically wound fiber glass strip.

One end of shaft 61, as shown in FIGS. 2, 6 and 7, extends beyond its support 63 for connection with a shaft 64 by a universal coupling device 65, the shaft 64 being rotatably supported in bearings formed in the arms 66 and 67, FIGS. 4, 9 and 10, laterally extending from upright beams $b3$ and $b4$ respectively, the shaft 64 in turn is operatively connected to a shaft 70, FIGS. 4, 8 and 10, by a chain 70y engaging the sprocket wheels 70x and 70z, the latter being keyed on the shaft 70 which forms part of a driving mechanism, which will be hereinafter described in detail.

A base plate 71 is welded to the lower disposed ends of two upright supports $b1$, $b2$, and two upright supports $b3$ and $b4$, in the form of beams of channel-shaped cross-section, with the beams $b1$ and $b2$ held in spaced relation at their upper disposed ends by a plate 72, FIGS. 4 and 8, while the beams $b3$—$b4$ are held in spaced relation by a plate 73, and on these spacer plates is mounted a hub-shaped member 74 having diametrically oppositely disposed fin elements 75 and 76 welded thereto serving for securing the hub-shaped member 74 onto the plates 72 and 73 by a plurality of bolts 77. Each end of hub member 74 is formed with a collar 78 and 79 provided for securely mounting the inner rings of ball bearings B1 and B2, each formed by the assembly of a pair of flat disc members 80 and 81, as best seen in FIG. 8, secured to their respective collars 78 and 79 by a plurality of screws 82 and 83. Similarly, the outer rings of ball bearings B1 and B2 are each formed by the assembly of a pair of discs-shaped members 84 and 85, the discs of each pair being secured in assembled relation to each other by a plurality of screws 86 and 87, also serving for collectively securing the sprocket wheels 88 and 89, and spacer members $m$ and $m1$ to the outer disposed ring elements of ball bearings B1, B2 above mentioned.

Sprocket wheels 88 and 89 are operatively connected to respective driving sprocket wheels 84y and 85y keyed to one end of shafts 95 and 95y by chains 90 and 91, while on the opposite ends of these shafts are keyed the angle gears 92 and 93 with which angle gear 94, shown in FIGS. 8, 9 and 10, form part of a differential gear mechanism for actuating the outer disposed rings 84 and 85 of ball bearings B1 and B2 in opposite direction to each other for right and lift hand winding of strips $St$ and $St2$ on the longitudinally wrapped strips on the core. The shafts 95 and 95y are supported in bearing blocks 97 and 98 securely mounted onto the channel beams 99 and 100, and at one of their ends in a common bearing block 96, while the shaft 101 of angle gear 94 is rotatably supported in a bearing block 102 carried by a transversely disposed bar 103 having its ends welded to the spacer beams 99 and 100, FIGS. 4, 8, 9 and 10, and in a bearing formed with a transverse bar 104.

The differential gear mechanism comprising the angle gears 92, 93 and 94 above mentioned, is operatively connected to a motor 105 through a speed reducer mechanism 106, as by belts 107 and pulleys 108 and 109, the speed reducer having an outboard pinion 110 disposed in meshing engagement with a gear 111 mounted for free rotation on the end of shaft 70 as a unit with an element 113 of a clutching device CL, while the complement 114 of this clutching device is keyed onto the shaft 70 but slidable thereon by the operation of a handle lever 112. The operation of shaft 70 through pinion 115 keyed thereon, is effective to rotate the gear 116 keyed on the hub portion of angle gear 92 for rotating the latter and thereby the angle gears 94 and 93 and the sprocket wheels 84y and 85y for rotating the outer ring elements 84 and 85 of ball bearings B1 and B2 in opposite direction through their respective chain 90 and 91.

Onto the ring element 84 of ball bearing B1 is mounted to one side thereof a spider-shaped bracket 117 which carries a spindle 118 serving for rotatably supporting a spool 119 on which the strip St of fiber glass material is coiled to be helically wound onto the longitudinally disposed fiber glass strips on core 23 by the conjoint operation of the spool 119, and the longitudinal movement of core 23, and thereby that of the strips r1, r2, r3, r4, r5 and r6.

Similarly, on the outer ring element 85 of ball bearing B2 is mounted a bracket 120 carrying a spindle 121 serving for rotatably mounting a spool 122 on which the strip St2, of a material generally known in the trade as Mylar, is coiled, each spool 119 and 122 being held frictionally from free rotation on their respective spindle by the tension of coiled springs 118 and 118y bearing against disc members 123, 123y. Arms 124 and 124y are secured to their respective outer disposed ball bearing ring elements and to one arm of their respective bracket 117 and 120, these arms being provided at their free ends with similar sets of stud members 125 engaged by their respective strip as shown in FIG. 8, to perform a function which will be hereinafter described in detail.

Figure 3A:
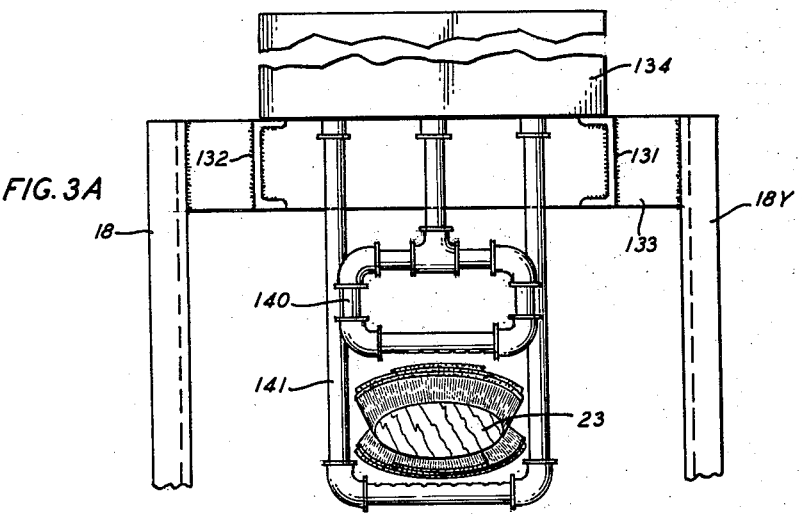
FIG. 3A is a sectional view taken on line 3A—3A of FIG. 3 showing the tank for the plastic material and the conduits for directing the spray material toward the elements comprised in the rail.
Figure 3:
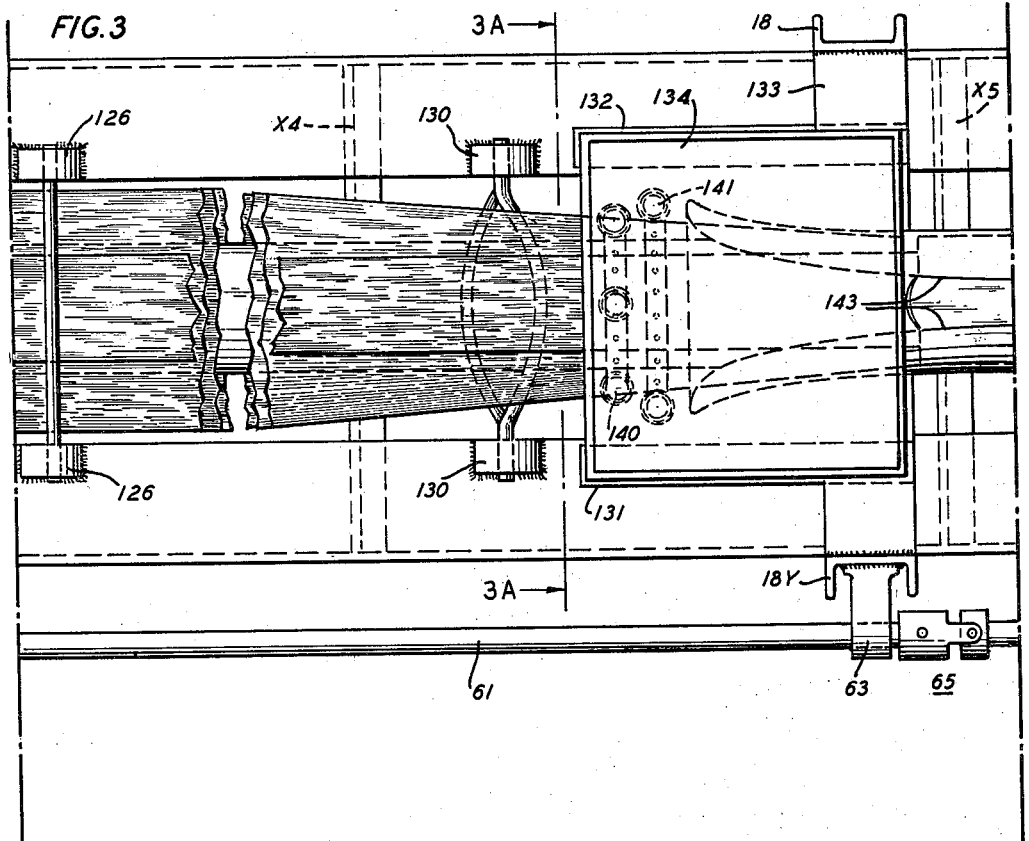
FIG. 3 is a top assembly view showing the fiber glass strips and the core at the plastic spraying position adjacent the front end of the strips folding die device in the machine, the fiber glass strips being shown with portions broken away to show the core more clearly in position between the two sets of strips.

The fiber glass strips r1, r2 and r3 are collectively supported in a set formation by a roller 135 mounted for rotary movement on upright supports 136, welded at their lower disposed ends on channel-shaped beams 10—10y, these strips are deflected from roller 135 to a line substantially parallel with the core 23 by a rod 127 mounted on upright supports 126 having their lower disposed ends welded to the beams 10—10y, FIGS. 3 and 7. The strips r1, r2 and r3 are in addition supported by a convex-bent rod 128 disposed adjacent the flared end of a combined guiding and forming die device 90, the rod 128 being provided to curve the strips transversely so as to register with one side of the periphery of the core 23 to thereby facilitate the movement of the strips into the guiding and forming device simultaneously with the longitudinal movement of the core.

Similarly, the set of strips r4, r5 and r6, from the bent formed by spool 44, are directed onto a roller 138 journaled in bearing apertures in beams 10—10y, and from the roller 138 these strips are directed over a concave-bent rod 129, also disposed adjacent the flared end of forming die 90, and both rods 128 and 129 are held securely by a weld at their ends on upright supports 130 in the position shown in FIGS. 3 and 7, the supports extending perpendicularly from the channel beams 10—10y.

To the top disposed ends of upright channel-shaped beams 18 and 18y are welded the elements 131, 132 and 133 of a frame serving for supporting a tank 134 having downwardly extending conduits 140 for wetting the fiber strips r1, r2 and r3, and conduits 141 for wetting the strips r4, r5 and r6 in their advancing movement and that of the core 23 through the wrapping die 90, which consists, as best seen in FIGS. 3, 7 and 11, of a tubing 137 having its wall forming a tapered ellipse provided with a longitudinal opening 143, and its front end flared outwardly as above mentioned, for facilitating the movement of the strips and that of the core 23 therein while causing the strips to wrap in overlapping relation to each other, the small end of the die being dimensioned as to tightly fit over the periphery of the core and strips assembly to cause the tensioning of the strips to a high degree upon the movement of the core. A wedge-shaped plate 142, FIG. 11, is formed to register with the contour of the core transversely thereof to a distance substantially one-half the periphery of the core so as to close the opening 143 upon the outwardly flexing movement of the die as caused by any inequality in the dimension of the core and that of the strips following the saturation of the latters with plastic material.

In a typical operation of the machine of the present invention, a core 23 constructed for example of balsa wood which is to be wrapped with reinforcing plastic impregnated fiber glass strips to form a rail of a ladder as shown in FIG. 12, is placed in position to rest over the rollers 20, 21 and 22, and inserted between the pairs of driving and idle rollers 27—27y, 28—28y and 29—29y, FIGS. 5 and 6, to position the end of the core in the space between or limited by the support 130 and the conduits 140 and 141. The core 23 is held against rotary movement upon the winding of the helical strips by the pairs of rollers 144 and 145 mounted on respective upright supports 154 and 155. In that position of the core the fiber glass strips r1, r2 and r3 are placed in superposed relation to each other over the roller 135, then under the rod 127, FIG. 3, and over the convex curved rod 128, when the ends of these strips are secured to that end of the core in any well known manner.

Similarly, the fiber glass strips r4, r5 and r6 from spool 44, are directed in position over the roller 138, and over the concave-bent rod 129, with their ends secured to the end of the core and wrapped a short distance manually around the core and inserted into the die followed by the insertion of the die complement plate 142 in position as shown in FIG. 11. It is to be noted that the strips r1 and r2 of one set, and the strips r4 and r5 of the other set, are made of a width sufficiently large to overlap each other to approximately two-thirds the periphery of the core. The ends of the fiber glass strip St on spool 119 is secured to the core over the longitudinal disposed strips r1, r2, etc. by means of staples or any other well known attaching means. In that position the operation of ring elements 84 and 85 of ball bearings B1 and B2, as will be hereinafter described in detail, is effective to wind a number of turns of fiber glass strip St around the longitudinally disposed strips upon the conjoint movement of the core and the rotation of ring element 85 to a distance when the end of core 23 protrudes from this end of mounting hub member 74 for permitting the securing of the Mylar strip St2 to that end of the core, and the machine is now ready to perform all the operations required for the completion of the rail shown in FIG. 12.

The operation of motor 105, FIGS. 8 and 9, is effective to rotate the gear 111 and the element 113 of clutching device CL, through pinion 110 of the speed reducer 106. The engagement of clutch CL by the operation of handle lever 112 in turn is effective to rotate the shaft 70, FIGS. 8, 9 and 10, and through pinion 115 the gear 116 and thereby the differential gear mechanism for rotating the ring elements 84 and 85 of ball bearings B1 and B2, and thereby the spool magazines 119 and 122 in opposite direction to each other, for winding the fiber glass strip St over the longitudinal fiber glass strips, and the Mylar strip St2 over the fiber glass strip St simultaneously with the operation of shaft 61 connected to shaft 64 by the coupling device 65, the shaft 64 in turn being operatively connected to shaft 70 by sprocket wheels 70z and 70x and chain 70y, shown in FIGS 4, 8 and 10.

The operation of shaft 61 is transmitted to shaft 55 through sprocket wheel 59, the chain 60, and sprocket wheel 58 keyed on shaft 55. The operation of shaft 55 is effective to rotate the driving rollers 27y, 28y and 29y through their angle gears 49—52, 50—53, and 51—54 for moving the core 23 held in frictional engagement between these driving rollers and the idle rollers 30, 31 and 32 under tension of springs 34 associated with each pair of rollers, thus forcing the fiber glass strips r1, r2 and r3, and the fiber glass strips r4, r5 and r6, into the forming die 90 while these strips are being sprayed with a plastic from the tank 134 flowing into the conduits 140 and 141 connected to this tank, the rate of advance of the core and that of the longitudinally disposed strips r1, r2 and r3, and r4, r5 and r6, attached thereto, relative to the width of the fiber glass St being such as to cause the strips thus coiled to overlap each other a distance of substantially one-quarter of an inch.

A second plastic filled tank 152 shown in FIG. 4, is fitted over the upward extending conduit 150 secured to the mounting hub member 74 to serve for spraying the coiled fiber glass strips S*t* prior to the winding of the removable Mylar strip S*t*2 to produce or form thereon, as shown by the rail FIG. 12, a smooth surface over the coiled fiber glass strip S*t*, which is followed by the removal of the Mylar strip in the final operation.

The excess of plastic material flowing from the surface of the rail during the spraying operation of the plastic thereon from the tank 152, being received in a chute 151 placed into the mounting hub member 74 to fall by gravity therefrom into a tank (not shown) resting onto the beams 11—11*y* forming the base of the frame of the machine.

What we claim is:

1. A machine for collectively and simultaneously wrapping a plurality of fiber glass strips disposed in lengthwise superposed relation to each other around a core of balsa wood having an ellipse cross-section forming a rail for use in a ladder, said machine comprising, a mounting frame, a motor mounted on said frame, a gear mechanism actuated by said motor, a plurality of roller members actuated by said gear mechanism for imparting a longitudinal movement to the core and to the strips attached to one end of the core, spring means for pressing said roller members against the core, a two-part forming die mounted on said frame in position for engagement by the core and the strips upon the operation of said roller members, said die consisting of a tapered longitudinally slotted tubular member and a tapered curved wedge-shaped member forming the complement of said forming die and adjustable relative to each other for controlling the pressure of said die over the strips, each cross-section of said die taken along the length thereof corresponding to the ellipse peripheral contour of the core and having its front end portion flared outwardly relative to the direction of movement of the core, the reduced end portion of said die in the assembled adjusted relation being dimensioned to tightly fit over the strips on the core to cause such strips to wrap under tension upon the movement of the core as effected by the operation of said roller members by said gear mechanism.

2. A machine for wrapping lengthwise strips around a core of elliptical cross-section forming a rail used in a ladder and wrapping a strip helically around the lengthwise wrapped strips, said machine comprising an elongated horizontally disposed mounting frame, a motor mounted on said frame, a spool magazine for each of the lengthwise strips, a shaft for each of said spool magazine disposed transversely to the length of said frame, said spool being disposed to the sides opposite the major axis of the elliptical cross-section of the core, a plurality of pairs of roller members directly frictionally engaging the core, each of said rollers having an effective surface shaped to correspond to the elliptical curvature of the core, a two part forming die device mounted on said frame in coaxial alignment with the core, a driving mechanism for said roller members connected to said motor for moving the core and the lengthwise strips into said die, the two parts of said die being adjustable relative to each other for controlling the pressure engagement of said die onto the lengthwise strips to cause such strips to wrap under maximum tension around the core with a number of the strips wrapping with their longitudinal edges in overlapping relation to each other around the core, a hub-shaped member mounted on said frame, said roller members positioning the core in concentric relation with the longitudinal axis of said hub-shaped member for axial movement therein, a disc member mounted for rotation on said hub-shaped member, a spool magazine for the helically-wound strip carried by said disc member, a gear mechanism connecting with said rollers driving mechanism and operable for actuating said disc member for bodily moving the spool magazine carried thereby in a circle concentric to the core simultaneously with the operation of said roller members by said driving mechanism to cause the winding of the strip carried by said disc member helically around the lengthwise disposed strips.

3. A machine used for winding strips in two directions of orientation relative to each other over a core of ellipse cross section forming part of a rail in a ladder, said machine comprising a mounting frame consisting of horizontally and parallelly disposed beams and pairs of upright beams secured to the last mentioned beams, a spool magazine for each of a number of the strips arranged in parallelly disposed rows on said frame, the last mentioned strips being arranged in superposed sets of three strips in each set extending to the opposite side of the core which forms the curvature generated by the major axis of the elliptical cross-section of the core, the last mentioned strips in each set having one of their ends attached to one end of the core, a tubular-shaped die having a cross section registering with the ellipse periphery of the core, a motor, a plurality of roller members mounted on said frame, a driving mechanism connecting with said motor for actuating said roller members for moving the core and the strips attached thereto into said die to cause the wrapping of the strips under tension in one direction of orientation around the core with a number of the strips in each set wrapping with their parellel edges in overlapping relation to each other, a hub-shaped member mounted on the upright beams of said frame, a flat disc element mounted for rotation on said hub member, a spool magazine carried by said disc element, and an angle gear mechanism connected to the first mentioned mechanism operable for coiling the strip carried by said disc element in the other direction of orientation over the longitudinal strips, a spider-shaped bracket carried by said disc element having a plurality of stud members disposed in staggered relation to each other engaged by the helically winding strip for controlling the winding tension thereof.

4. A machine for wrapping a number of strips lengthwise over a core having an elliptical cross-section and another strip helically over the lengthwise strips and another strip over the helically-wrapped strip, the lengthwise strips being arranged by sets around the sides formed by the major axis of the elliptical cross-section of the core; said machine comprising an elongated mounting frame, a motor, a spool magazine for each of the lengthwise strips in each set, a supporting shaft for each of said spool magazine disposed transversely to the length of said frame, the lengthwise strips of each set having one of their ends securely attached to the core at one end thereof, roller members having their effective surface corresponding to the contour of the transverse section of the core, said roller members disposed on said frame in position for engaging the core and operable for moving the latter and the lengthwise strips in each set, means for pressing said roller members directly against the core, a gearing mechanism operatively connected to said motor for actuating said roller members, a two part forming die device mounted on said frame in engageable relation with the core and the strips attached thereto to cause the wrapping of all the longitudinal strips around the core with a number of such strips in each set wrapping with their longitudinal edges in overlapping relation to each other upon the movement of the core and all the strips through said die device, the two parts of said the device being adjustable lengthwise relative to each other for controlling the tension of the lengthwise strips of each set along the core, a differential gear mechanism actuated by said motor, a cylindrically hub-shaped member mounted on said frame, a disc-shaped member mounted on each end of said cylindrically hub-shaped member and each forming the inner race of a ball bearing, a ring mounted on each of said disc-shaped members actuated by said differential mechanism, a spool magazine carried by each of said rings for helically winding one of the other strips over the sets of longitudinally wrapped strips and the winding of another of the other strips over the helically winding strips simultaneously.

5. In a machine for wrapping a number of strips lengthwise over a core having an ellipse cross-section and other strips helically over the lengthwise strips, said machine comprising, in combination, an elongated mounting frame, a plurality of shafts disposed at right angles to the direction of said frame, a spool magazine for the lengthwise wrapped strips mounted for free rotary movement on said shafts, the lengthwise strips being arranged by sets of three strips in each set to the opposite side of the core, and the strips in each set having one of their ends securely attached to one end of the core for movement therewith, a plurality of roller members having their effective surfaces shaped to register with the ellipse cross-section of the core mounted for rotation on said frame, a motor for actuating said roller members for moving the core and the strips attached thereto longitudinally, means on said frame for controlling the pressure engagement of said roller members against the core, a two part die device forming a taper of elliptical cross-section mounted on said frame in position for engagement by the core and the strips secured thereto, the two parts of said die device being adjustable lengthwise relative to each other for controlling the pressure engagement of the core and the strips therein to cause the lengthwise strips to wrap under controlled tension in superposed relation to each other over and along the length of the core, a number of lengthwise strips in one set wrapping with their longitudinal edges in overlapping relation with a number of lengthwise strips of the other set upon the movement of the lengthwise strip in said die, a gear differential mechanism operatively connected to said motor, a cylindrically hub-shaped member mounted on said frame, a disc-shaped member mounted on each end of said hub-shaped member, a spool magazine mounted on each of said disc-shaped members for movement concentric to the elliptical core by the operation of said gear differential mechanism for winding one of the last mentioned strip helically in one direction over the longitudinally extending strips and another of the last mentioned strips in opposite direction over the helically-wound strip simultaneously with the operation of said roller driving mechanism and said gear differential mechanism.

References Cited in the file of this patent
UNITED STATES PATENTS

| | | |
|---|---|---|
| 934,683 | Lutz | Sept. 21, 1909 |
| 1,932,942 | Thordarson | Oct. 31, 1933 |
| 2,256,263 | Haycock | Sept. 16, 1941 |
| 2,285,263 | Fitch | June 2, 1942 |
| 2,343,747 | Chernack | Mar. 7, 1944 |
| 2,714,414 | Ganahl et al. | Aug. 2, 1955 |
| 2,723,705 | Collins | Nov. 15, 1955 |
| 2,731,067 | Miller | Jan. 17, 1956 |
| 2,760,549 | Nash et al. | Aug. 28, 1956 |
| 2,777,501 | Fischer | Jan. 15, 1957 |
| 3,068,134 | Cilker | Dec. 11, 1962 |